United States Patent
Hanzawa et al.

(10) Patent No.: US 8,364,368 B2
(45) Date of Patent: Jan. 29, 2013

(54) ACCELERATION CONTROL APPARATUS FOR VEHICLE

(75) Inventors: Masatoshi Hanzawa, Kariya (JP); Masayoshi Takeda, Kariya (JP); Hiroyuki Kodama, Kariya (JP); Hajime Kumabe, Kariya (JP)

(73) Assignees: Advics Co., Ltd., Aichi-pref. (JP); DENSO CORPORATION, Kariya (JP)

( * ) Notice: Subject to any disclaimer, the term of this patent is extended or adjusted under 35 U.S.C. 154(b) by 391 days.

(21) Appl. No.: 12/654,471

(22) Filed: Dec. 22, 2009

(65) Prior Publication Data

US 2010/0185375 A1  Jul. 22, 2010

(30) Foreign Application Priority Data

Jan. 19, 2009 (JP) ................................. 2009-008659

(51) Int. Cl.
*B60T 8/172* (2006.01)
(52) U.S. Cl. ............ 701/70; 701/93; 477/124; 477/143; 318/432
(58) Field of Classification Search .................... 701/70, 701/93, 22; 477/124, 86, 154; 318/560, 318/609, 615
See application file for complete search history.

(56) References Cited

U.S. PATENT DOCUMENTS

| | | | | |
|---|---|---|---|---|
| 5,097,809 A | * | 3/1992 | Sekozawa et al. | 123/406.19 |
| 5,272,423 A | * | 12/1993 | Kim | 318/560 |
| 6,189,836 B1 | * | 2/2001 | Gold et al. | 244/191 |
| 6,319,170 B1 | * | 11/2001 | Hubbard et al. | 477/107 |
| 6,358,184 B1 | * | 3/2002 | Steinmetz et al. | 477/143 |
| 6,364,811 B1 | * | 4/2002 | Hubbard et al. | 477/143 |
| 6,876,168 B1 | * | 4/2005 | Luo et al. | 318/560 |
| 6,914,404 B2 | * | 7/2005 | Kaku et al. | 318/568.22 |
| 7,010,408 B2 | * | 3/2006 | Kitazawa et al. | 701/70 |
| 7,023,150 B2 | * | 4/2006 | Hisada et al. | 318/34 |
| 7,164,247 B2 | * | 1/2007 | Joe et al. | 318/432 |
| 7,211,028 B2 | * | 5/2007 | Matsumura | 477/124 |
| 7,328,955 B2 | * | 2/2008 | Tsukasaki | 303/190 |
| 7,801,658 B2 | * | 9/2010 | Ohshima | 701/93 |

(Continued)

FOREIGN PATENT DOCUMENTS

| | | |
|---|---|---|
| JP | A-58-076180 | 5/1983 |
| JP | A-2002-127783 | 5/2002 |

(Continued)

OTHER PUBLICATIONS

Office Action mailed Jul. 17, 2012 in corresponding Japanese Application No. 2009-008659 (and English translation).

*Primary Examiner* — Thomas Black
*Assistant Examiner* — Wae Louie
(74) *Attorney, Agent, or Firm* — Posz Law Group, PLC

(57) ABSTRACT

A reliability for a power-train feed-forward torque may be decreased when a degree of reliability for an estimated braking torque is decreased due to disturbance factors. A power-train feedback torque is corrected based on a degree of reliability for a power-train torque, for which a reliability for a braking condition is taken into account. In a similar manner, a brake feedback torque is corrected based on a degree of reliability for a braking torque, for which a reliability for a power-train condition is taken into account. Accordingly, it is possible to compensate the decrease of reliability for the power-train feed-forward torque or brake feed-forward torque by the correction for the power-train feedback torque or the brake feedback torque.

12 Claims, 6 Drawing Sheets

U.S. PATENT DOCUMENTS

| | | | |
|---|---|---|---|
| 2003/0100404 A1* | 5/2003 | Matsumura et al. | 477/124 |
| 2005/0285442 A1* | 12/2005 | Tsukasaki | 303/186 |
| 2006/0017414 A1* | 1/2006 | Joe et al. | 318/432 |
| 2007/0251236 A1* | 11/2007 | Barthelet et al. | 60/608 |
| 2008/0238108 A1* | 10/2008 | Edelson et al. | 290/40 C |
| 2010/0004843 A1* | 1/2010 | Yu et al. | 701/102 |
| 2010/0145559 A1* | 6/2010 | Gauthier et al. | 701/22 |
| 2010/0185375 A1* | 7/2010 | Hanzawa et al. | 701/70 |
| 2011/0251780 A1* | 10/2011 | Yu et al. | 701/104 |

FOREIGN PATENT DOCUMENTS

| | | |
|---|---|---|
| WO | WO 2004/045898 | 6/2004 |

* cited by examiner

ACCELERATION CONTROL APPARATUS FOR VEHICLE

CROSS REFERENCE TO RELATED APPLICATION

This application is based on Japanese Patent Application No. 2009-008659 filed on Jan. 19, 2009, the disclosure of which is incorporated herein by reference.

FIELD OF THE INVENTION

The present invention relates to an acceleration control apparatus for a vehicle for obtaining an acceleration in a vehicle traveling direction, which is required for a feed-forward control and a feedback control.

BACKGROUND OF THE INVENTION

An acceleration control apparatus for a vehicle is known in the art, as disclosed, for example, in Patent Publication No. 2006-506270 of an international patent application published in Japan (International Publication No. WO 2004/045898 A2). According to such a prior art, a desired vehicle acceleration is automatically adjusted by means of controlling an acceleration in a vehicle traveling direction. The above desired vehicle acceleration is obtained by carrying out a feed-forward control and a feedback control at a vehicle acceleration control portion, which is also performing a brake control and an engine control.

In the prior art, however, performance of an acceleration control in the vehicle traveling direction may be decreased, for example, immediately after an ignition switch is turned on, in case of a computing limit of ECU, or when a disturbance such as a temperature change occurs. For example, when a power-train torque estimated by a power-train control portion (such as, an engine ECU, etc.) is used for the feed-forward control, and estimation accuracy for such estimated power-train torque is decreased, an error may be generated in a demand value for an axle torque, which is calculated as a feed-forward component. As a result, the performance of the acceleration control in the vehicle traveling direction is decreased.

SUMMARY OF THE INVENTION

The present invention is, therefore, made in view of the foregoing problem, and has an object to provide an acceleration control apparatus for a vehicle, according to which a possible accuracy decrease caused by the disturbance for the feed-forward control is compensated and the performance of the acceleration control in the vehicle traveling direction is improved.

According to a feature of the invention, an acceleration control apparatus for a vehicle has a feed-forward control portion for outputting a feed-forward torque and a feedback control portion for outputting a feedback torque, wherein the acceleration control apparatus outputs a demand torque based on the feed-forward torque and the feedback torque in order to control an acceleration of a vehicle in a vehicle traveling direction. The acceleration control apparatus further has a calculating portion for calculating a degree of reliability for the input torque to the feed-forward control portion, and a correcting portion for correcting the feedback torque in such a way that a gain for the feedback control portion is increased in accordance with a decrease of the degree of the reliability for the input torque calculated at the calculating portion.

Since the reliability for the input torque is decreased by disturbance factors and thereby reliability for the feed-forward torque is correspondingly decreased, the gain for the feedback control is increased to correct the feedback torque. As a result, decrease of accuracy for the feed-forward control is compensated, to thereby improve performance of acceleration control of a vehicle in a vehicle traveling direction.

According to another feature of the invention, the input torque is an estimated braking torque, which is estimated for an actually generated braking torque, and the feedback control portion is a power-train feedback control portion for outputting a power-train feedback torque. In such a case, the feed-forward control portion calculates a power-train feed-forward torque based on a demand axle torque, which is demanded for carrying out an acceleration control of the vehicle in the vehicle traveling direction, and based on the estimated braking torque. In addition, the calculating portion calculates the degree of reliability for a braking condition. Then, the correcting portion corrects the power-train feedback torque in such a way that the gain for the power-train feedback control portion is increased in accordance with the decrease of the degree of the reliability for the braking condition.

According to a further feature of the invention, the calculating portion includes a selecting portion for selecting a degree of the reliability depending on the braking condition, and calculates a correction coefficient for a power-train feedback control based on a selected degree of the reliability for the braking condition. Then, the correcting portion corrects the power-train feedback torque outputted from the power-train feedback control portion in such a manner that a corrected power-train feedback torque becomes larger as the degree of the reliability for the braking condition becomes lower.

According to a still further feature of the invention, the calculating portion has a map or a function expression for indicating a relationship between the degree of the reliability for the braking condition and the correction coefficient for the power-train feedback control, so that the calculating portion obtains the correction coefficient for the power-train feedback control corresponding to the degree of the reliability for the braking condition based on the map or the function expression. Then, the correcting portion corrects the power-train feedback torque based on the correction coefficient for the power-train feedback control.

According to a still further feature of the invention, the input torque is an estimated power-train torque, which is estimated for an actually generated power-train torque, and the feedback control portion is a brake feedback control portion for outputting a brake feedback torque. In such a case, the feed-forward control portion calculates a brake feed-forward torque based on a demand axle torque, which is demanded for carrying out an acceleration control of the vehicle in the vehicle traveling direction, and based on the estimated power-train torque. In addition, the calculating portion calculates the degree of reliability for a power-train condition. Then, the correcting portion corrects the brake feedback torque in such a way that the gain for the brake feedback control portion is increased in accordance with the decrease of the degree of the reliability for the power-train condition.

According to a still further feature of the invention, the calculating portion includes a selecting portion for selecting a degree of the reliability depending on the power-train condition, and calculates a correction coefficient for a brake feedback control based on a selected degree of the reliability for the power-train condition. Then, the correcting portion corrects the brake feedback torque outputted from the brake feedback control portion in such a manner that a corrected brake feedback torque becomes larger as the degree of the reliability for the power-train condition becomes lower.

According to a still further feature of the invention, the calculating portion has a map or a function expression for indicating a relationship between the degree of the reliability for the power-train condition and the correction coefficient for the brake feedback control, so that the calculating portion obtains the correction coefficient for the brake feedback control corresponding to the degree of the reliability for the power-train condition based on the map or the function expression. Then, the correcting portion corrects the brake feedback torque based on the correction coefficient for the brake feedback control.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
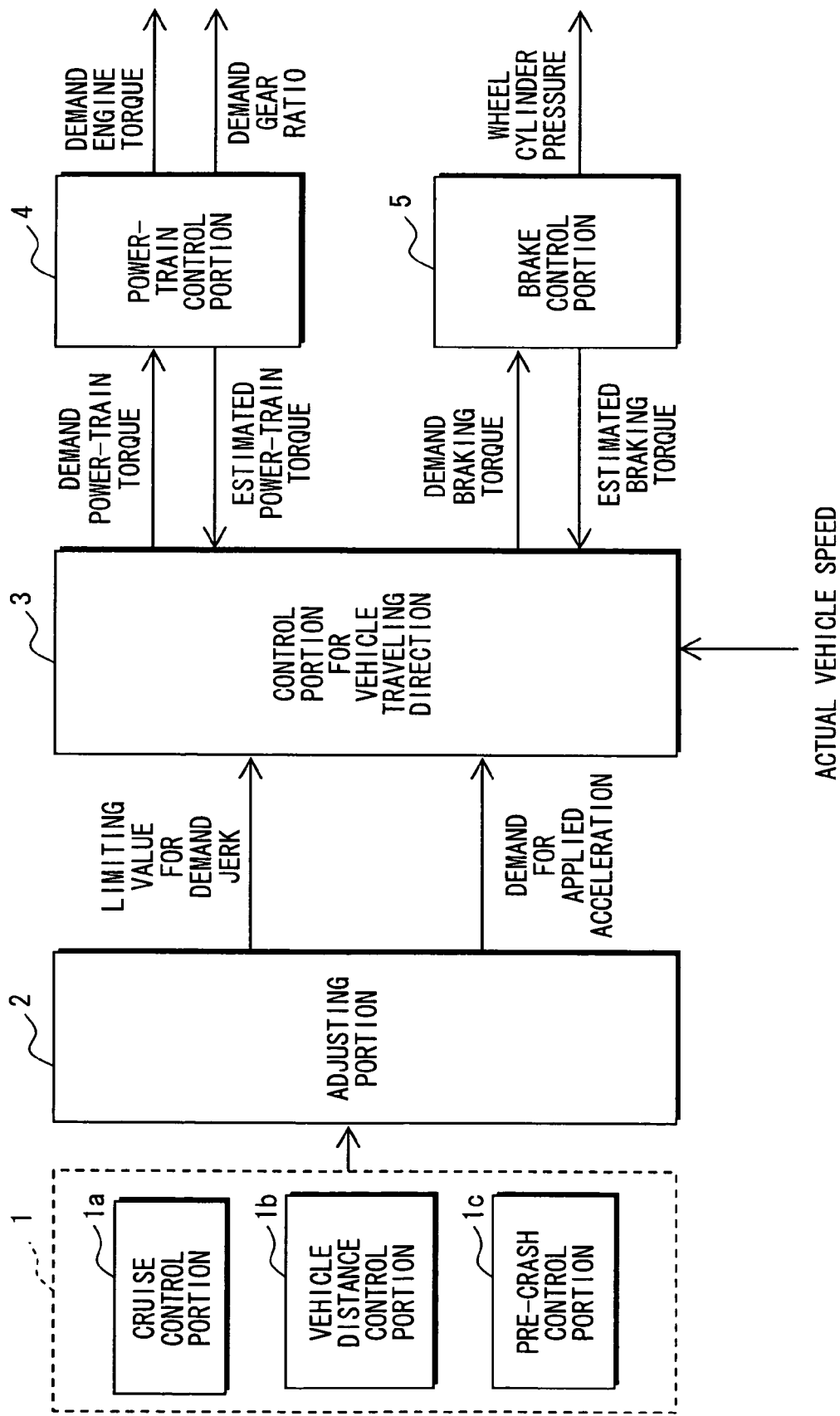
FIG. 1 is a block diagram showing a vehicle driving-braking control system according to a first embodiment of the present invention.

Embodiments of the present invention will be hereinafter explained with reference to drawings. The same reference numerals are used through the following embodiments for such portions which are identical or equivalent to each other.
(First Embodiment)

A first embodiment of the present invention will be explained. In the first embodiment, an acceleration control apparatus for a vehicle, which is applied to a vehicle driving-braking control system, will be explained.

FIG. 1 is a block diagram showing a vehicle driving-braking control system (hereinafter also referred to as a vehicle control system). As shown in FIG. 1, the vehicle control system has an acceleration demanding portion 1, an adjusting portion 2, a control portion 3 for a vehicle traveling direction, a power-train control portion 4, and a brake control portion 5. The control portion 3 among the above portions corresponds to an acceleration control apparatus in the vehicle traveling direction.

The acceleration demanding portion 1 outputs a demand signal for acceleration depending on a vehicle condition, in accordance with demands from respective applications (respective control portions) for carrying out a vehicle acceleration control in the vehicle traveling direction. According to the present embodiment, the acceleration demanding portion 1 for carrying out the respective applications is composed of a cruise control portion $1a$, a vehicle distance control portion $1b$, and a pre-crash control portion $1c$. The cruise control portion $1a$ outputs a demand signal for acceleration, which is necessary for controlling a vehicle traveling speed at a constant value. The vehicle distance control portion $1b$ outputs a demand signal for acceleration, which is necessary for controlling a distance to a front vehicle at a predetermined value. The pre-crash control portion $1c$ outputs a demand signal for acceleration which is necessary for avoiding a crash with the front vehicle.

The adjusting portion 2 adjusts accelerations indicated by the respective demand signals from the acceleration demanding portion 1 in order to output a variation of an acceleration demanding value for each control cycle. Namely, the adjusting portion 2 outputs a jerk, which corresponds to a differentiated value of the acceleration demanding value in the vehicle traveling direction, as a demand for an applied acceleration. In addition, the adjusting portion 2 calculates a limiting value for the jerk depending on the vehicle condition and outputs it as the limiting value for a demand jerk.

Figure 2:
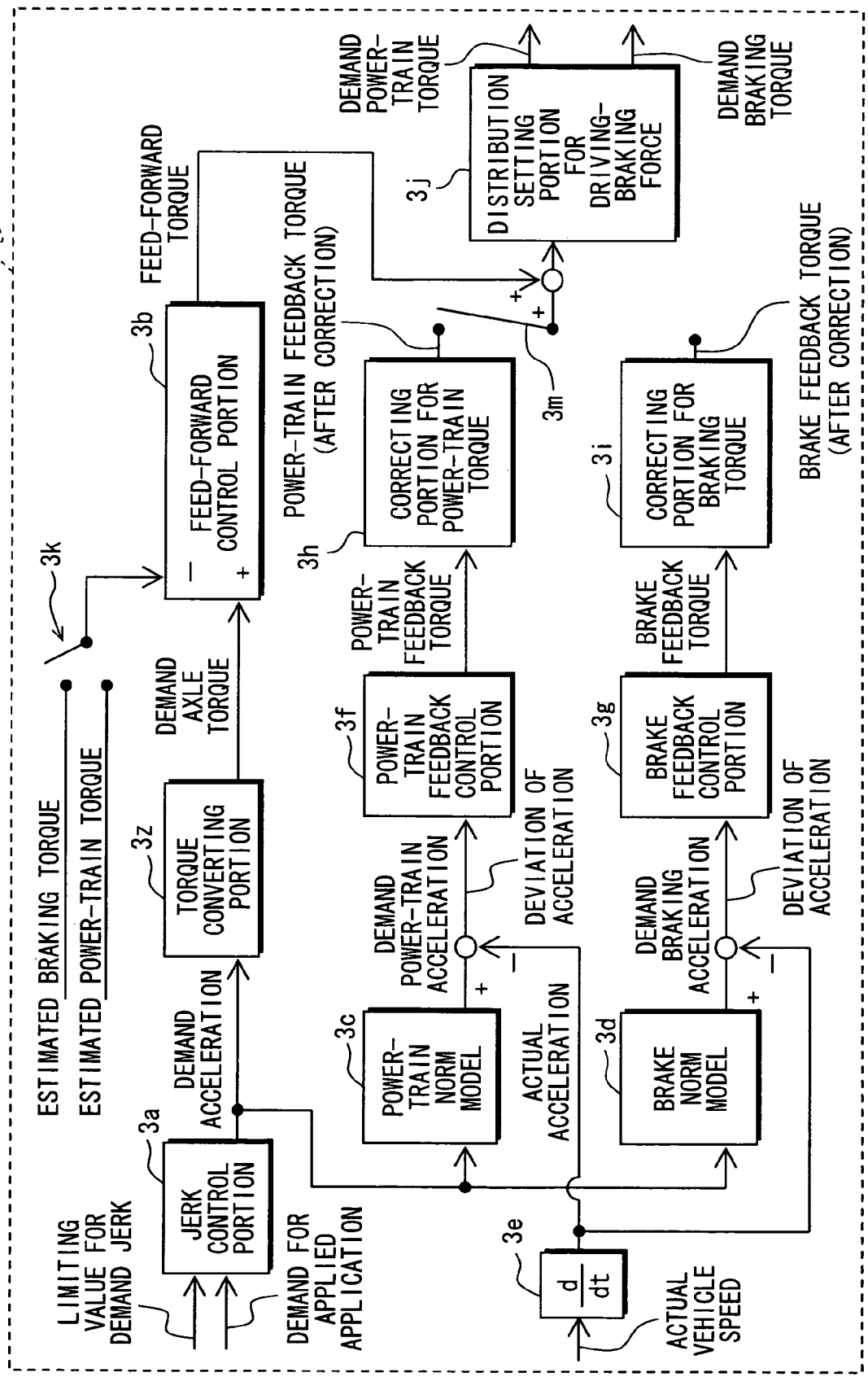
FIG. 2 is a block diagram schematically showing an inside structure of a control portion for a vehicle traveling direction.

The control portion 3 for the vehicle traveling direction receives not only the above differentiated value of the acceleration demanding value (that is, the demand for the applied acceleration) and the limiting value for the demand jerk from the adjusting portion 2 but also an estimated value (an estimated power-train torque) for a power-train torque actually generated at the power-train control portion 4 as well as an estimated value (an estimated braking torque) for a braking torque actually generated at the brake control portion 5. Furthermore, the control portion 3 receives a vehicle speed signal from a meter ECU (not shown). Then, the control portion 3 calculates a demand power-train torque as well as a demand braking torque. More exactly, the control portion 3 carries out a feed-forward control and a feedback control based on the above demand for the applied acceleration, the limiting value for the demand jerk, the estimated power-train torque, the estimated braking torque, and an actual vehicle speed indicated by the vehicle speed signal. Then, the control portion 3 calculates a demand power-train torque and a demand braking torque. FIG. 2 is a block diagram schematically showing an inside structure of the control portion 3 for the vehicle traveling direction.

As shown in FIG. 2, the control portion 3 for the vehicle traveling direction is composed of a jerk control portion $3a$, a torque converting portion $3z$, a feed-forward control portion $3b$, a memory portion $3c$ for a power-train norm model, a memory portion $3d$ for a brake norm model, a differential portion $3e$, a power-train feedback control portion $3f$, a brake feedback control portion $3g$, a correcting portion $3h$ for a power-train torque, a correcting portion $3i$ for a braking torque, a distribution setting portion $3j$ for a driving-braking force, and input switch-over portions $3k$ and $3m$.

The jerk control portion $3a$ calculates a demand acceleration corresponding to the demand for the applied application outputted from the adjusting portion 2. In the above calculation, the jerk control portion $3a$ calculates the demand acceleration, while a variation of the acceleration is limited by the limiting value for the demand jerk also outputted from the adjusting portion 2. For example, in the case that the demand for the applied acceleration is a demand for accelerating a vehicle, the demand acceleration becomes a positive value. On the other hand, in the case that the demand for the applied acceleration is a demand for decelerating the vehicle, the demand acceleration becomes a negative value.

The torque converting portion $3z$ calculates to convert the demand acceleration calculated by the jerk control portion $3a$ into a torque, so that the demand acceleration is converted into a demand axle torque. A relationship between acceleration and axle torque is in advance obtained based on an equation of motion and vehicle specifications. The torque conversion from the demand acceleration to the demand axle torque is carried out based on such relationship.

The feed-forward control portion $3b$ carries out a feed-forward control in order to bring an actual vehicle acceleration to a value close to the demand for the applied acceleration. More exactly, the feed-forward control portion $3b$ calculates a feed-forward torque based on the demand axle torque outputted from the torque converting portion $3z$ as well as the estimated braking torque or the estimated power-train torque. Which of the estimated braking torque or estimated power-train torque is selected as an input torque for the feed-forward control portion $3b$ depends on a switching position of the input switch-over portion $3k$.

The feedforward control portion $3b$ respectively calculates a power-train feed-forward torque and a brake feed-forward torque by subtracting the inputted estimated braking torque or the inputted estimated power-train torque from the inputted demand axle torque. This is expressed by the following formula (1) or (2):

"Power-train Feed-forward Torque"="Demand Axle Torque"−"Estimated Braking Torque" <Formula 1>

"Brake Feed-forward Torque"="Demand Axle Torque"−"Estimated Power-train Torque" <Formula 2>

In the case of calculating the power-train feed-forward torque, the estimated braking torque is subtracted from the demand axle torque. Since the estimated braking torque is a negative value, the power-train feed-forward torque is calculated in such a manner that the demand axle torque is increased as a result of subtracting the negative value. Accordingly, the feed-forward control is carried out, in which the estimated braking torque is taken into account, so that such a control is realized as to more quickly accelerate the vehicle in response to the demand for acceleration.

In the case of calculating the brake feed-forward torque, the estimated power-train torque is subtracted from the demand axle torque. Since the estimated power-train torque is a positive value, the brake feed-forward torque is calculated in such a manner that the demand axle torque is decreased as a result of subtracting the positive value. Accordingly, the feed-forward control is carried out, in which the estimated power-train torque is taken into account, so that such a control is realized as to more quickly decelerate the vehicle in response to the demand for deceleration.

As above, the estimated braking torque is used for carrying out the feed-forward control of the power-train torque, while the estimated power-train torque is used for carrying out the feed-forward control of the braking torque. Therefore, for example, when the demand for the applied acceleration is the positive value, the feed-forward control portion $3b$ is used for the feed-forward control of the power-train torque. For that purpose, the input switch-over portion $3k$ is switched to a position, so that the estimated braking torque is inputted to the feed-forward control portion $3b$ in order to calculate the power-train feed-forward torque. On the other hand, when the demand for the applied acceleration is the negative value, the feed-forward control portion $3b$ is used for the feed-forward control of the braking torque. In this case, the input switch-over portion $3k$ is switched to the other position, so that the estimated power-train toque is inputted to the feed-forward control portion $3b$ in order to calculate the brake feed-forward torque.

The memory portion $3c$ for the power-train norm model stores a norm model for carrying out the feedback control of the power-train torque, according to which a demand power-train acceleration is set corresponding to the demand acceleration. The norm model used here is in advance set depending on individual vehicle characteristics.

The memory portion $3d$ for the brake norm model stores a norm model for carrying out the feedback control of the braking torque, according to which a demand braking acceleration is set corresponding to the demand acceleration. The norm model used here is likewise in advance set depending on individual vehicle characteristics.

The differential portion $3e$ calculates an actually generated acceleration (hereinafter, an actual acceleration) by differentiating the actual vehicle speed indicated by the vehicle speed signal. The vehicle speed signal can be obtained via a vehicle LAN, for example, from the meter ECU (not shown). In the present embodiment, the actual acceleration is calculated by the differential portion $3e$. However, if the actual acceleration is already calculated by another ECU (not shown), such calculated value (the actual acceleration) may be inputted to the control portion 3.

Each of the power-train feedback portion $3f$ and the brake feedback control portion $3g$ carries out a feedback control in order to bring the actual acceleration to the value close to the demand for the applied acceleration. More exactly, the power-train feedback portion $3f$ calculates a power-train feedback torque so that a deviation of the acceleration (which is obtained by subtracting the actual acceleration from the demand power-train acceleration set by the memory portion $3c$ for the power-train norm model) may become closer to zero. In a similar manner, the brake feedback portion $3g$ calculates a brake feedback torque so that a deviation of the acceleration (which is obtained by subtracting the actual acceleration from the demand braking acceleration set by the memory portion $3d$ for the brake norm model) may become closer to zero. In the above calculation of the power-train feedback torque and the brake feedback torque, a well known control (such as PID control etc.) used in a calculation for a general feedback control can be used.

Each of the correcting portion $3h$ for the power-train torque and the correcting portion $3i$ for the braking torque corrects the power-train feedback torque and the brake feedback torque in accordance with a degree of reliability. The degree of reliability for the power-train feedback torque and the brake feedback torque as well as a method for correcting them will be explained below.

The distribution setting portion $3j$ for the driving-braking force sets a distribution for actually outputted driving-braking forces based on an additional value of a power-train feedback torque (after correction) calculated at the correcting portion $3h$ for the power-train torque (or a brake feedback torque (after correction) calculated at the correcting portion $3i$ for the braking torque) and the power-train feed-forward torque calculated at the feed-forward control portion $3b$ (or the brake feed-forward torque calculated at the feed-forward control portion $3b$). The distribution for the driving-braking forces is transmitted to the power-train control portion 4 and the brake control portion 5 respectively as a demand power-train torque and a demand braking torque. Which of the power-train feedback torque or the brake feedback torque is selected as an input to the distribution setting portion 3j depends on a switching position of the input switch-over portion 3m. A switching condition of the input switch-over portion 3m is similar to that of the input switch-over portion 3k. For example, when the demand for the applied acceleration is the positive value, the power-train feedback torque is inputted, while the brake feedback torque is inputted to the distribution setting portion 3j when the demand for the applied acceleration is the negative value.

The power-train control portion 4 is composed of, for example, a power-train ECU and so on, and outputs a demand value for torque to an engine (a demand engine torque) and a demand value for a gear ratio to an automatic transmission apparatus (a demand gear ratio) depending on the demand power-train torque. The brake control portion 5 is likewise composed of, for example, a brake ECU and so on, and outputs a demand value for a wheel-cylinder pressure (a demand braking pressure) which is generated by a hydraulic braking actuator depending on the demand braking torque. As a result, a driving force and a braking force are generated, each of which depends on the distribution for the driving-braking forces, so that a desired vehicle acceleration can be achieved.

In each of the power-train control portion 4 and the brake control portion 5, the estimated power-train torque and the estimated braking torque are calculated through an estimation calculation or based on measured values by sensors. The estimated power-train torque and the estimated braking torque, which are respectively calculated by the power-train and brake control portions 4 and 5, are inputted to the control portion 3, so that those estimated torques are used for calculating the power-train feed-forward torque or the brake feed-forward torque.

The degree of reliability as well as the correcting method for the power-train feedback torque and the brake feedback torque, which are respectively calculated in the correcting portions 3h and 3i, will be explained.

As explained above, the power-train feed-forward torque is calculated by subtracting the estimated braking torque from the demand axle torque. Therefore, when the degree of reliability for the estimated braking torque, for example, accuracy of the estimation calculation for the estimated braking torque, is decreased, the degree of reliability for the power-train feed-forward torque may be correspondingly decreased. According to the present embodiment, however, the possible decrease of accuracy for the power-train feed-forward torque is compensated by correcting the power-train feedback torque at the correcting portion 3h for the power-train torque depending on the degree of reliability for the power-train feed-forward torque. Accordingly, the decrease of accuracy for the power-train torque is totally prevented.

Figure 3:
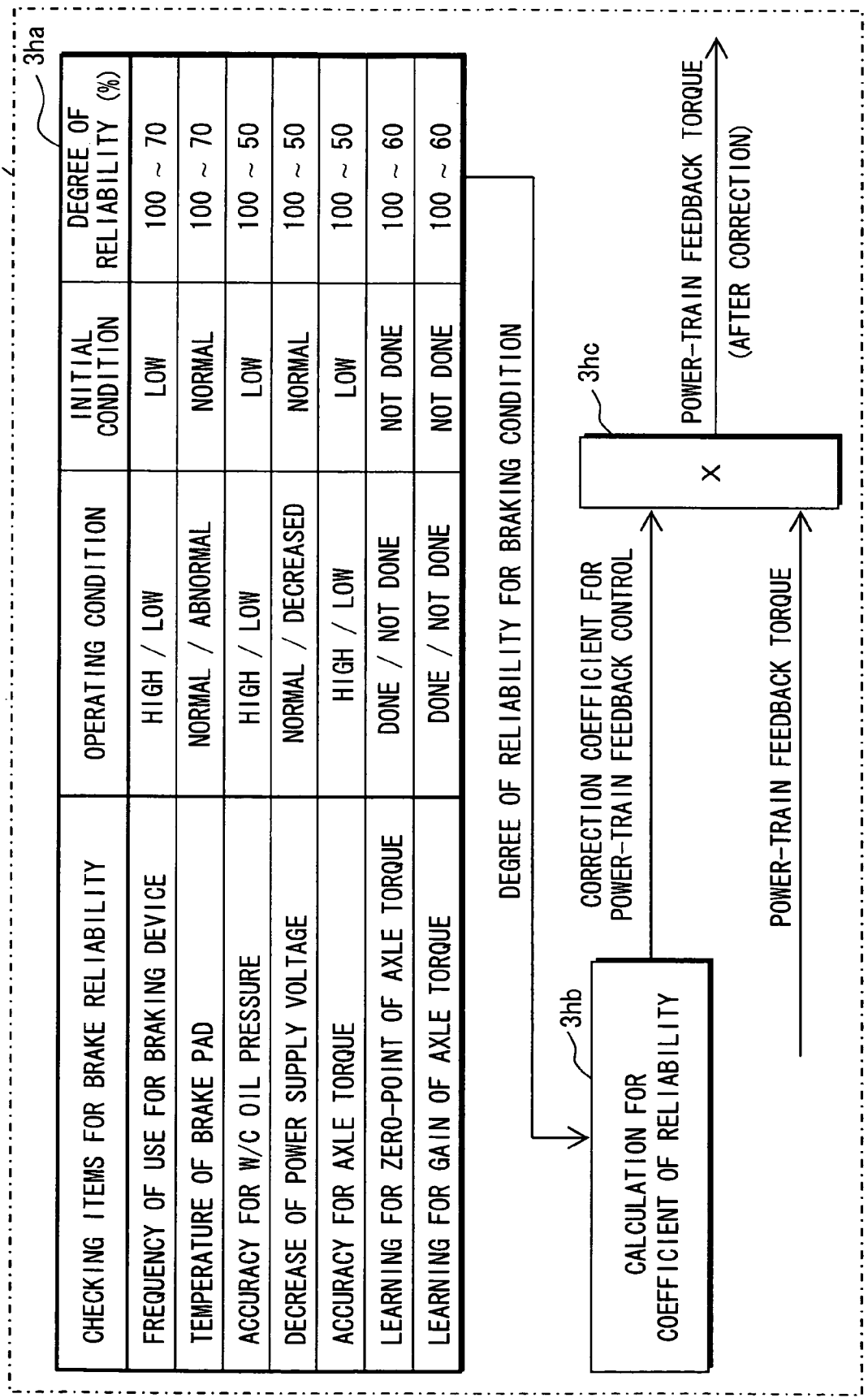
FIG. 3 is a block diagram schematically showing an inside structure of a reliability correction portion $3h$ for a power-train torque.

FIG. 3 is a block diagram schematically showing an inside structure of the correcting portion 3h for the power-train torque. As shown in the drawing, the correcting portion 3h for the power-train torque is composed of a selecting portion 3ha for selecting a degree of reliability depending on a braking condition, a calculating portion 3hb for calculating a coefficient of reliability, and a multiplying portion 3hc.

The selecting portion 3ha checks a reliability for the braking condition (hereinafter, a brake reliability), which is one of disturbance factors affecting the reliability for the power-train feed-forward torque, and selects a degree of reliability corresponding to the braking condition. According to the present embodiment, the selecting portion 3ha has a map for various operating conditions, initial conditions and degrees of reliability, for respective checking items relating to the brake reliability, so that the selecting portion aha selects and outputs a corresponding degree of reliability for the respective checking items.

As explained above, the estimated braking torque is taken into account for calculating the power-train feed-forward torque. However, the degree of reliability for the estimated braking torque may be decreased, if each or some of the checking items shown in the map (FIG. 3) would adversely affect as the disturbance factor (s) to the calculation for the estimated braking torque at the brake control portion 5. Therefore, the selecting portion 3ha is provided here in order to carry out the correction for the power-train feedback torque by use of the reliability of the braking condition.

For example, as shown in FIG. 3, the checking items for the reliability of the braking condition include frequency of use for a braking device, temperature of a brake pad, accuracy of oil pressure for a wheel cylinder (W/C), decrease of power supply voltage, accuracy of axle torque, learning for zero-point of the axle torque, learning for gain of the axle torque, and so on.

In relation to the frequency of use for the braking device, the degree of reliability for the estimated braking torque will be decreased when the frequency of use becomes higher. Therefore, the initial condition for the frequency of use is set at "low", and the degree of reliability is set at a value within a range, for example, between 100-70% depending on a condition for the frequency of use. For example, the degree of reliability may be set at 100% when the frequency of use is lower than a predetermined value (i.e. when the frequency of use is low), while the degree of reliability may be set at 70% when the frequency of use is higher than the predetermined value (i.e. when the frequency of use is high). Alternatively, the degree of reliability may be gradually (e.g. linearly) decreased from 100% down to 70%, as the frequency of use becomes higher.

In relation to the temperature of the brake pad, the degree of reliability for the estimated braking torque will be likewise decreased, when the temperature becomes too high. Therefore, the initial condition for the temperature of the brake pad is set at "normal", and the degree of reliability is set at a value within a range, for example, between 100-70% depending on a condition whether the temperature of the brake pad is normal or abnormal. For example, the degree of reliability may be set at 100% when the temperature of the brake pad is lower than a predetermined value (i.e. when the temperature of the brake pad is normal), while the degree of reliability may be set at 70% when the temperature of the brake pad is higher than the predetermined value (i.e. when the temperature of the brake pad is abnormal). Alternatively, the degree of reliability may be gradually (e.g. linearly) decreased from 100% down to 70%, as the temperature of the brake pad becomes higher.

In relation to the accuracy of oil pressure for the wheel cylinder (W/C), the degree of reliability for the estimated braking torque will be also decreased as the accuracy of oil pressure becomes lower. Therefore, the initial condition for the accuracy of oil pressure is set at "low", and the degree of reliability is set at a value within a range, for example, between 100-50% depending on a condition for the accuracy of oil pressure. For example, the degree of reliability may be set at 100% when the accuracy of oil pressure is higher than a predetermined value (i.e. when the accuracy of oil pressure is high), while the degree of reliability may be set at 50% when the accuracy of oil pressure is lower than the predetermined value (i.e. when the accuracy of oil pressure is low). Alternatively, the degree of reliability may be gradually (e.g. linearly) increased up to 100%, as the accuracy of oil pressure becomes higher.

The frequency of use for the braking device can be calculated at the brake control portion 5 as a number of use for a unit time or as a time period for the use. The temperature of the brake pad can be also calculated (estimated) at the brake control portion 5 based on the time period for the use of the braking device. Furthermore, the accuracy of oil pressure for the wheel cylinder (also referred to as wheel cylinder pressure) can be calculated at the brake control portion 5 as a difference value between a demand oil pressure corresponding to the demand braking torque and the actually outputted wheel cylinder pressure. Accordingly, the information relating to the checking items for the reliability of the braking condition can be obtained from the brake control portion 5. Other disturbance factor (s) (not shown in FIG. 3) relating to the reliability of the braking condition may be additionally listed up, so that the degree of reliability corresponding to such added disturbance factor (s) may be further selected and outputted.

In relation to the power supply voltage, the degree of reliability for the estimated braking torque will be decreased when the power supply voltage is decreased. Therefore, the initial condition for the power supply voltage is set at "normal", and the degree of reliability is set at a value within a range, for example, between 100-50% depending on a condition whether the power supply voltage is normal or decreased. For example, the degree of reliability may be set at 100%, when the power supply voltage is higher than a predetermined value (i.e. when the power supply voltage is normal), while the degree of reliability may be set at 50% when the power supply voltage is lower than the predetermined value (i.e. when the power supply voltage is decreased). Alternatively, the degree of reliability may be gradually (e.g. linearly) decreased from 100% down to 50%, as the power supply voltage becomes lower.

In relation to the accuracy of the axle torque, the degree of reliability for the estimated braking torque will be decreased when the accuracy of the axle torque is decreased. Therefore, the initial condition for the accuracy of the axle torque is set at "low", and the degree of reliability is set at a value within a range, for example, between 100-50% depending on a condition of the accuracy of the axle torque. For example, the degree of reliability may be set at 100% when the accuracy of the axle torque is higher than a predetermined value (i.e. when the accuracy of the axle torque is high), while the degree of reliability may be set at 50% when the accuracy of the axle torque is lower than the predetermined value (i.e. when the accuracy of the axle torque is low). Alternatively, the degree of reliability may be gradually (e.g. linearly) increased up to 100%, as the accuracy of the axle torque becomes higher.

In relation to the learning for zero-point of the axle torque and the learning for gain of the axle torque, the degree of reliability for the estimated braking torque will be decreased when the learning control is not yet carried out (indicated as "not done" in FIG. 3). Therefore, the initial conditions for the learning (for zero-point and gain of the axle torque) are respectively set at "not done", and the degree of reliability is set at a value within a range, for example, between 100-60% depending on a condition whether the learning control is carried out (indicated as "done" in FIG. 3) or not. For example, the degree of reliability may be set at 100% when the learning control is carried out ("done"), while the degree of reliability may be set at 60% when the learning control is not yet carried out ("not done").

The decrease of the power supply voltage can be detected at the power-train control portion 4 by detection of a battery voltage. The accuracy for the axle torque can be calculated at the power-train control portion 4 as a difference value between an axle torque calculated from the demand power-train torque and an axle torque calculated from the actually outputted demand engine torque and the demand gear ratio. With respect to the learning for zero-point and gain of the axle torque, records thereof can be stored. Accordingly, the information relating to the checking items for the reliability of the vehicle condition can be obtained from the power-train control portion 4. Although not shown in FIG. 3, a condition immediately after an ignition switch is turned on or ambient temperature may be additionally listed up as other disturbance factors relating to the reliability of the vehicle condition, and the degree of reliability for the respective disturbance factors may be selected and outputted.

The calculating portion 3*hb* for the coefficient of the reliability calculates a correction coefficient for the power-train feedback control based on the degree of reliability for the braking condition. The correction coefficient for the power-train feedback control corresponds to a weighting amount, which is used for correcting the power-train feedback torque in accordance with the degree of reliability for the braking condition. A relationship of the correction coefficient for the power-train feedback control with respect to the degree of reliability for the braking condition is in advance stored as a map or a function expression (four rules computing equation), based on which the correction coefficient for the power-train feedback control is calculated.

Figure 4:
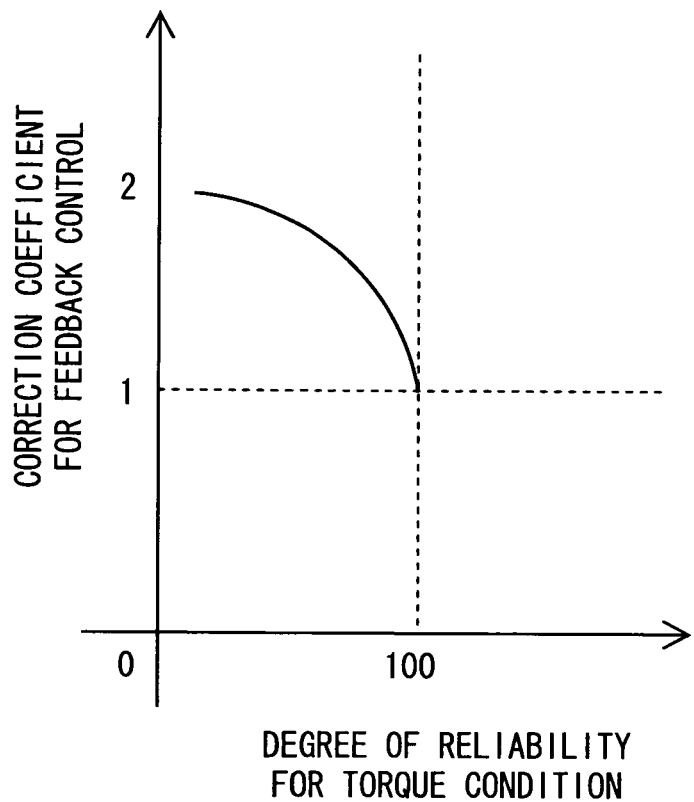
FIG. 4 is a map showing an example of a relationship of a correction coefficient for a feedback control with respect to a degree of reliability for a torque condition.

FIG. 4 is a map showing an example of a relationship of a correction coefficient for a feedback control with respect to a degree of reliability for a torque condition. Since the relationship shown in the map can be applied not only to the power-train torque but also to the braking torque, a horizontal axis and a vertical axis are simply indicated (generalized) as "degree of reliability for torque condition" and "correction coefficient for feedback control" in the drawing.

As shown in the drawing, the correction coefficient for the feedback control is "1" when the degree of reliability for the torque condition is 100%, and the correction coefficient for the feedback control is gradually increased from "1" as the degree of reliability for the torque condition is decreased from 100%. In the case that the map of FIG. 4 is applied to the relationship of the correction coefficient for the power-train feedback control with respect to the degree of reliability for the braking condition, the correction coefficient for the power-train feedback control can be obtained by selecting a value corresponding to the degree of reliability for the braking condition.

Figure 5:
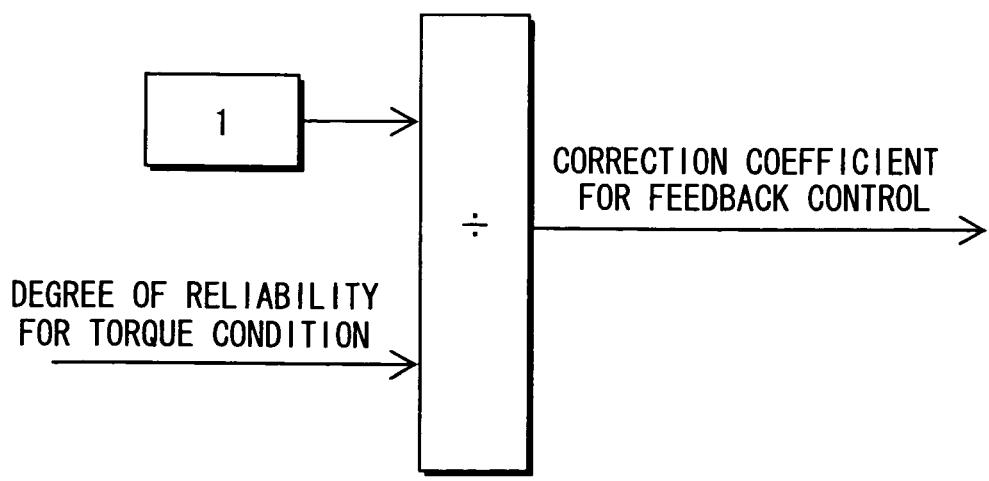
FIG. 5 is a block diagram showing a method for calculating (by four arithmetic operations) the correction coefficient for the feedback control based on the degree of reliability for the torque condition.

FIG. 5 is a block diagram showing a method for calculating (by four arithmetic operations) the correction coefficient for the feedback control based on the degree of reliability for the torque condition. Since the calculating method (four arithmetic operations) shown in the drawing can be likewise applied not only to the power-train torque but also to the braking torque, the degree of reliability and the correction coefficient are simply indicated (generalized) by "the degree of reliability for the torque condition" and "the correction coefficient for the feedback control". As shown in the drawing, when the four arithmetic operations are applied, the correction coefficient for the feedback control can be obtained by calculating a multiplicative inverse for the degree of reliability for the torque condition (=100/the degree of reliability for the torque condition (%)).

As above, the correction coefficient for the power-train feedback control is set at a larger value, as the degree of reliability for the braking condition (i.e. the degree of reliability for the estimated braking torque) becomes lower.

The multiplying portion 3*hc* corrects the power-train feedback torque in a way that the power-train feedback torque (calculated at the power-train feedback control portion 3*f*) is multiplied by the correction coefficient for the power-train feedback control (calculated at the calculating portion 3*hb*). Since the correction coefficient for the power-train feedback control is the weighting amount corresponding to the degree of reliability for the braking condition, a rate of correction for the power-train feedback torque becomes larger as the degree of reliability for the braking condition is lower. Conversely, the rate of correction for the power-train feedback torque becomes smaller as the degree of reliability for the braking condition is higher. As above, the power-train feedback torque (after correction) can be calculated.

Figure 6:
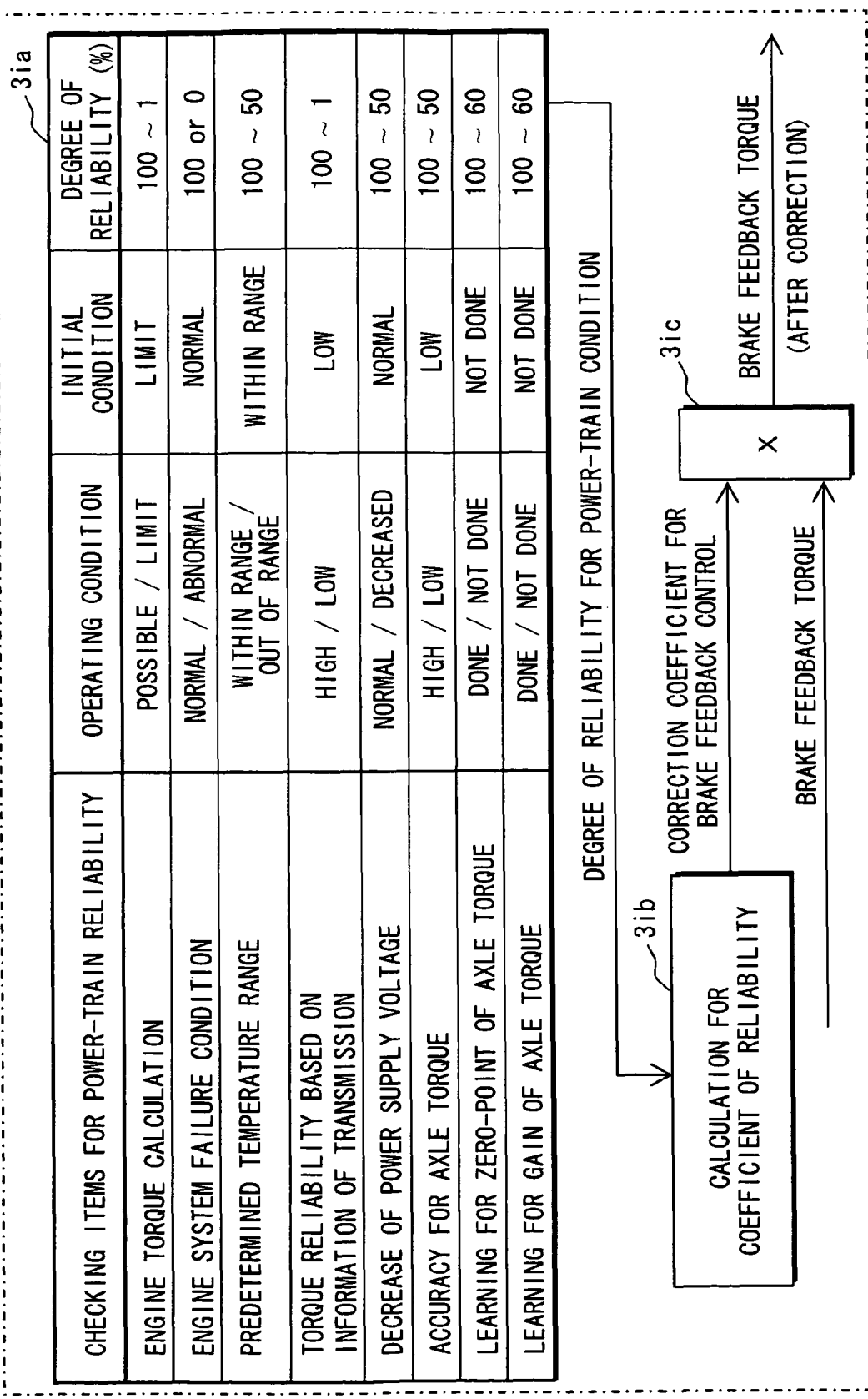
FIG. 6 is a block diagram schematically showing an inside structure of a reliability correction portion $3i$ for a braking torque.

FIG. 6 is a block diagram schematically showing an inside structure of the correcting portion 3*i* for the braking torque. As shown in the drawing, the correcting portion 3*i* for the braking torque is composed of a selecting portion 3*ia* for selecting a degree of reliability depending on a power-train condition, a calculating portion 31*b* for calculating a coefficient of reliability, and a multiplying portion Sic.

The selecting portion 3*ia* checks a reliability for the power-train condition (hereinafter, a power-train reliability), which is one of disturbance factors affecting a reliability for the brake feed-forward torque, and selects a degree of reliability corresponding to the power-train condition. According to the present embodiment, the selecting portion 3*ia* has a map for various operating conditions, initial conditions and degrees of reliability, for respective checking items relating to the power-train reliability, so that the selecting portion 3*ia* selects and outputs a corresponding degree of reliability for the respective checking items.

As explained above, the estimated power-train torque is taken into account for calculating the brake feed-forward torque. The selecting portion 3*ia* is provided here in order to carry out the correction for the brake feedback torque by use of the reliability of the power-train condition.

For example, as shown in FIG. 6, the checking items for the reliability of the power-train condition include engine torque calculation, engine system failure condition, a predetermined temperature range for engine cooling water, torque reliability based on transmission information, and so on.

In relation to the engine torque calculation, the degree of reliability for the estimated power-train torque will be decreased when there is a calculation limit for the engine torque calculation. For example, the degree of reliability for the estimated power-train torque will be decreased by information for a transitional torque change, which may occur when a calculation for a turbine rotational speed of a torque converter reaches its calculation limit. The calculation for the turbine rotational speed may reach its calculation limit, when an engine rotational speed is low or when a vehicle speed is low.

Therefore, the initial condition for the engine torque calculation is set at "limit", and the degree of reliability is set at a value within a range, for example, between 100-1% depending on a condition whether the engine torque calculation is in a possible condition or in a limit condition. For example, the degree of reliability may be set at 100% when the engine torque calculation is possible, while the degree of reliability may be set at 1% when the engine torque calculation is in the limit condition. Alternatively, the degree of reliability may be gradually (e.g. linearly) decreased from 100% to 1%, depending on the condition for the calculation limit.

In relation to the engine system failure condition, the degree of reliability for the estimated power-train torque will be decreased when an engine system becomes out of order or its operation is made invalid. Therefore, the initial condition for the engine system failure condition is set at "normal", and the degree of reliability is set at a value of either 100% or 0%, depending on a condition whether the engine system failure condition is normal or abnormal. Namely, the degree of reliability is 100% when the engine system failure condition is normal, and 0% when the engine system failure condition is abnormal.

When the temperature of the engine cooling water is out of the predetermined temperature range, viscous resistance of oil for the engine or a transmission apparatus is decreased, and thereby the degree of reliability for the estimated power-train torque will be decreased. Therefore, the initial condition is set at "within the range", and the degree of reliability is set at a value within a range, for example, between 100-50% depending on the temperature of the engine cooling water. For example, the degree of reliability may be set at 100% when the temperature of the engine cooling water is within the predetermined temperature range, while the degree of reliability may be set at 50% when the temperature of the engine cooling water is out of the predetermined temperature range. Alternatively, the degree of reliability may be gradually (e.g. linearly) decreased from 100% down to 50%, as the temperature of the engine cooling water becomes higher in a range out of the predetermined temperature range.

In relation to the torque reliability based on transmission information, the degree of reliability for the estimated power-train torque will be decreased, for example, when a one-way clutch is in an idling condition during a gear change for an automatic transmission apparatus or a vehicle speed reduction, or when a clutch is in a half-engagement in a manual transmission apparatus. Therefore, the initial condition is set at "low" and the degree of reliability is set at a value within a range, for example, between 100-1% depending on a condition of the torque reliability, which is obtained from the information from the transmission apparatus. For example, the degree of reliability may be set at 100% when the torque reliability based on the information from the transmission apparatus is high, while the degree of reliability may be set at 1% when the torque reliability is low. Alternatively, the degree of reliability may be gradually (e.g. linearly) decreased from 100% down to 1% depending on the condition of the torque reliability.

The power-train control portion 4 can determine whether the engine torque calculation is in the possible condition or in the limit condition. The power-train control portion 4 can also determine, at its respective malfunction determining portions, whether the engine system failure condition is in the normal or the abnormal condition. Further, based on a detection signal from a temperature sensor, the power-train control portion 4 can determine whether the temperature of the engine cooling water is within the predetermined temperature range. Since the information for the transmission apparatus is transmitted, from a transmission ECU (not shown) to the power-train control portion 4, the power-train control portion 4 can determine whether the torque reliability is high or low. As above, the degree of reliability for the respective checking items related to the reliability of the power-train condition can be obtained from the power-train control portion 4. Other disturbance factors (not shown in FIG. 6) relating to the reliability of the power-train condition may be additionally listed up as checking items, so that degree of reliability corresponding to such added checking items may be selected and outputted. Since the checking items indicated in FIG. 6 other than those above explained, such as the decrease of the power supply voltage, are the same to those indicated in FIG. 3, the explanation thereof is omitted.

The calculating portion 3*ib* for the coefficient of the reliability calculates a correction coefficient for the brake feedback control based on the degree of reliability for the power-train condition. The correction coefficient for the brake feedback control corresponds to a weighting amount, which is used for correcting the brake feedback torque in accordance with the degree of reliability for the power-train condition. A relationship of the correction coefficient for the brake feedback control with respect to the degree of reliability for the power-train condition is in advance stored as a map or a function expression (four rules computing equation), based on which the correction coefficient for the brake feedback control is calculated.

For example, the correction coefficient for the brake feedback control with respect to the power-train condition can be calculated in a similar manner for calculating the correction coefficient for the power-train feedback control with respect to the braking condition, for which the map shown in FIG. 4 and the four arithmetic operations shown in FIG. 5 are used.

As above, the correction coefficient for the brake feedback control is set at a larger value, as the degree of reliability for the power-train condition (i.e. the degree of reliability for the estimated power-train torque) becomes lower.

The multiplying portion Sic corrects the brake feedback torque in a way that the braking feedback torque (calculated at the brake feedback control portion $3g$) is multiplied by the correction coefficient for the brake feedback control (calculated at the calculating portion $3ib$). Since the correction coefficient for the brake feedback control is the weighting amount corresponding to the degree of reliability for the power-train condition, a rate of correction for the brake feedback torque becomes larger as the degree of reliability for the power-train condition is lower. Conversely, the rate of correction for the brake feedback torque becomes smaller as the degree of reliability for the power-train condition is higher. As above, the brake feedback torque (after correction) can be calculated.

According to the driving-braking control system for the vehicle, the adjusting portion 2 generates the demand for the applied acceleration and the limiting value for the demand jerk, based on the demand signal for the acceleration related to the vehicle condition outputted from the acceleration demanding portion 1. The control portion 3 for the vehicle traveling direction not only carries out the feed-forward control as well as the feedback control but also calculates the demand power-train torque and the demand braking torque, based on the demand for the applied acceleration and the limiting value for the demand jerk. The power-train control portion 4 outputs the demand value for the torque to the engine (the demand engine torque) and the demand value for the gear ratio to the automatic transmission apparatus (the demand gear ratio), based on the demand power-train torque, so as to carry out the engine output control and the automatic gear change control. The brake control portion 5 outputs the demand value for the wheel cylinder pressure (the demand braking pressure) in order that the hydraulic brake actuator generates the hydraulic pressure at the wheel cylinders. As a result, the driving force and the braking force are generated in accordance with the distribution of the driving-braking force, so that the desired acceleration can be obtained.

According to the above explained driving-braking control system for the vehicle, the following advantages may be obtained.

The degree of reliability for the power-train feed-forward torque is decreased as a result that the degree of reliability for the estimated braking torque is decreased by the disturbance factors. Therefore, according to the above driving-braking force control system for the vehicle, the power-train feedback torque is corrected in accordance with the degree of reliability for the braking condition, for which the reliability for the braking condition is taken into account. More exactly, the correction coefficient for the power-train feedback control is set at a value, which is larger than "1", in accordance with the degree of reliability for the braking condition. Then, the correction coefficient is multiplied by the power-train feedback torque, which is the output of the power-train feedback control portion $3f$. Accordingly, the above multiplication has the same effect to such a situation, in which the gain is increased in the power-train feedback control portion $3f$. It is, therefore, possible to compensate the decrease of the reliability for the power-train feed-forward torque by the correction of the power-train feedback torque.

According to the driving-braking control system of the present embodiment, the degree of reliability for the brake feed-forward torque is likewise decreased as a result that the degree of reliability for the estimated power-train torque is decreased by the disturbance factors. Therefore, according to the above driving-braking force control system, the brake feedback torque is corrected in accordance with the degree of reliability for the power-train condition, for which the reliability for the power-train condition is taken into account. More exactly, the correction coefficient for the brake feedback control is set at a value, which is larger than "1", in accordance with the degree of reliability for the power-train condition, and the correction coefficient is multiplied by the brake feedback torque. Accordingly, the above multiplication has the same effect to such a situation, in which the gain is increased in the brake feedback control portion $3g$. It is, therefore, possible to compensate the decrease of the reliability for the brake feed-forward torque by the correction of the brake feedback torque.

As above, the decrease of the accuracy for the feed-forward control caused by the disturbance factors can be compensated so as to improve the performance for the acceleration control in the vehicle traveling direction.

(Second Embodiment)

A second embodiment according to the present invention will be explained. In the second embodiment, when compared with the first embodiment, a method for correction at the correcting portion $3h$ with respect to the output (the power-train feedback torque) from the power-train feedback control portion $3f$ is changed. The other portions are the same to those of the first embodiment. Therefore, such portions which are different from the first embodiment will be explained.

Figure 7:
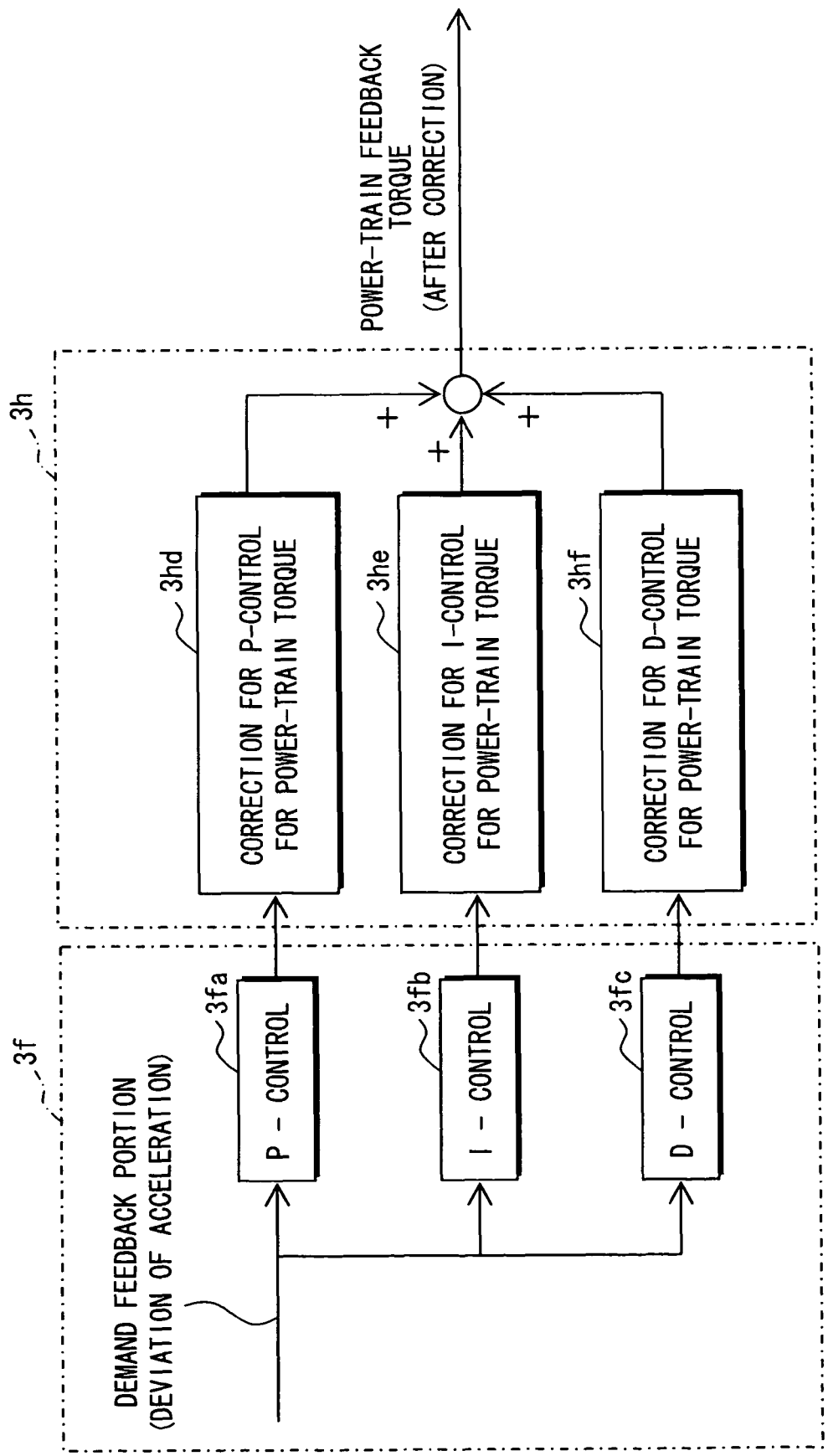
FIG. 7 is a block diagram showing a structure for a power-train control portion $3f$ and a reliability correcting portion $3h$ for the power-train torque, which are incorporated into a vehicle driving-braking control system according to a second embodiment of the present invention.

FIG. 7 is a block diagram showing a structure for the power-train control portion $3f$ and the correcting portion $3h$ for the power-train torque, which are incorporated into the vehicle driving-braking control system according to the second embodiment of the present invention.

As shown in the drawing, the power-train feedback control portion $3f$ carries out the feedback control by the PID control. Namely, the power-train feedback control portion $3f$ calculates power-train feedback torques at respective P-control (proportional control) portion $3fa$, I-control (integral control) portion $3fb$ and D-control (differential control) portion $3fc$, in response to the deviation of acceleration, which is obtained by subtracting the actual acceleration from the demand power-train acceleration set by the memory portion $3c$ for the power-train norm model. According to the present embodiment, each of the power-train feedback torques calculated at the respective P-, I- and D-control portions $3fa$, $3fb$ and $3fc$ is corrected by the correcting portion $3h$ for the power-train torque.

More exactly, the correcting portion $3h$ for the power-train torque is divided into three portions, namely a correcting portion 3*hd* for the P-control, a correcting portion 3*he* for the I-control and a correcting portion 3*hf* for the D-control. Each of the correcting portions 3*hd* to 3*hf* respectively sets a degree of reliability in accordance with respective input amounts from the power-train feedback control portion 3*f*. An inside structure for each of the correcting portions 3*hd* to 3*hf* is similar, for example, to that of FIG. 3, wherein the checking items as well as the degree of reliability may be adequately changed depending on characteristics of the respective P-, I- and D-control portions 3*fa* to 3*fc*.

As above, each of the power-train feedback torques calculated at the P-, I- and D-control portions 3*fa* to 3*fc* is corrected by multiplying different correction coefficients which are individually set. Then, the power-train feedback torques after correction are added to each other so as to finally obtain the power-train feedback torque after correction at the reliability correcting portion 3*h*.

As above, each of the power-train feedback torques calculated at the P-, I- and D-control portions 3*fa* to 3*fc* is individually corrected. As a result, in each of P-, I- and D-control portions 3*fa* to 3*fc*, each of the power-train feedback torques can be corrected depending on each characteristic of the P-, I- and D-control portions 3*fa* to 3*fc*. For example, a response may be emphasized in one of the P-, I- and D-control portions 3*fa* to 3*fc*.

In the present embodiment, the method for correcting the power-train feedback torque (from the power-train feedback control portion 3*f*) at the correcting portion 3*h* is explained. A similar method can be applied to the correcting portion 3*i* for the braking torque. Namely, the brake feedback torques are respectively calculated in P-, I- and D-control portions of the brake feedback control portion 3*g* and each of the brake feedback torques are individually corrected, in the correcting portion 3*i* for the braking torque.

(Other Embodiments)

(1) In the above embodiments, the feed-forward and feedback controls for the braking torque and the feed-forward and feedback controls for the power-train torque are carried out. However, the feedback braking torque and the feedback power-train torque may be separately calculated. For example, the present invention may be applied to such a system, in which not only a power-train feedback torque is calculated based on an estimated power-train torque through a feed-forward control but also a power-train feedback torque is calculated based on a demand axle torque through a feed-back control. In a similar manner, the present invention may be applied to such a system, in which not only a brake feedback torque is calculated based on an estimated braking torque through a feed-forward control but also a braking feedback torque is calculated based on a demand axle torque through a feedback control.

(2) In the above first embodiment, the power-train feedback torque (after correction) is obtained at the reliability correcting portion 3*h* by multiplying the power-train feedback torque (the output from the power-train feedback control portion 3*f*) by the correction coefficient for the power-train feedback control. According to the second embodiment, each of the power-train feedback torques calculated at the respective P-, I- and D-control portions 3*fa*, 3*fb* and 3*fc* is corrected by multiplying by each of the correction coefficients individually set by correcting portions 3*hd* to 3*hf* for P-, I- and D-controls, so that the power-train feedback torque (after correction) is finally obtained.

The above two methods may be combined in order to correct the power-train feedback torque. For example, the power-train feedback torques calculated at the respective P-, I- and D-control portions are individually corrected and those corrected power-train feedback torques are added together as in a similar manner to the second embodiment, and then such added torque is multiplied by the correction coefficient for the power-train feedback control as in a similar manner to the first embodiment so as to finally obtain the power-train feedback torque (after correction-).

(3) In the above embodiments, the estimated braking torque or the estimated power-train torque is used as the input for carrying out the feed-forward control, while the acceleration is used as the parameter for the feedback control. The present invention may be further applied to the acceleration control apparatus for the vehicle traveling direction, in which the feed-forward control and the feedback control are carried out at the same time, and in which other inputs and other parameters than those of the above embodiments are used.

In the above embodiment, the gain for the feedback control is increased when the reliability for the estimated braking torque or the estimated power-train torque is decreased. The gain for the feedback control may be decreased when the reliability for the estimated braking torque or the estimated power-train torque is increased as the result of the learning control.

What is claimed is:

1. In an acceleration control apparatus for a vehicle comprising:
a feed-forward control portion for carrying out a feed-forward control based on an input torque to output a feed-forward torque; and
a feedback control portion for carrying out a feedback control based on a predetermined parameter to output a feedback torque, wherein the acceleration control apparatus outputs a demand torque based on the feed-forward torque and the feedback torque in order to control an acceleration of a vehicle in a vehicle traveling direction,
the acceleration control apparatus further comprising:
a calculating portion for calculating a degree of reliability for the input torque to the feed-forward control portion, wherein the degree of reliability is calculated based on one of a plurality of disturbance factors affecting reliability for the feed-forward torque; and
a correcting portion for correcting the feedback torque in such a way that a gain for the feedback control portion is increased in accordance with a decrease of the degree of reliability for the input torque calculated at the calculating portion.

2. The acceleration control apparatus according to the claim 1, wherein
the input torque is an estimated braking torque, which is estimated for an actually generated braking torque,
the feedback control portion is a power-train feedback control portion for outputting a power-train feedback torque,
the feed-forward control portion calculates a power-train feed-forward torque based on a demand axle torque, which is demanded for carrying out an acceleration control of the vehicle in the vehicle traveling direction, and based on the estimated braking torque,
the calculating portion calculates the degree of reliability for a braking condition, and
the correcting portion corrects the power-train feedback torque in such a way that the gain for the power-train feedback control portion is increased in accordance with the decrease of the degree of reliability for the braking condition.

3. The acceleration control apparatus according to the claim 2, wherein the calculating portion includes a selecting portion for selecting the degree of reliability corresponding to the braking condition, and calculates a correction coefficient for a power-train feedback control based on the selected degree of reliability for the braking condition, and the correcting portion corrects the power-train feedback torque outputted from the power-train feedback control portion in such a manner that a corrected power-train feedback torque becomes larger as the degree of reliability for the braking condition becomes lower.

4. The acceleration control apparatus according to the claim 3, wherein the calculating portion has a map or a function expression for indicating a relationship between the degree of reliability for the braking condition and the correction coefficient for the power-train feedback control, so that the calculating portion obtains the correction coefficient for the power-train feedback control corresponding to the degree of reliability for the braking condition based on the map or the function expression, and the correcting portion corrects the power-train feedback torque based on the correction coefficient for the power-train feedback control.

5. The acceleration control apparatus according to the claim 3, wherein the input torque is an estimated power-train torque, which is estimated for an actually generated power-train torque, the feedback control portion is a brake feedback control portion for outputting a brake feedback torque, the feed-forward control portion calculates a brake feed-forward torque based on a demand axle torque, which is demanded for carrying out an acceleration control of the vehicle in the vehicle traveling direction, and based on the estimated power-train torque, the calculating portion calculates the degree of reliability for a power-train condition, and the correcting portion corrects the brake feedback torque in such a way that the gain for the brake feedback control portion is increased in accordance with the decrease of the degree of reliability for the power-train condition.

6. The acceleration control apparatus according to the claim 5, wherein the calculating portion includes a selecting portion for selecting the degree of reliability corresponding to the power-train condition, and calculates a correction coefficient for a brake feedback control based on the selected degree of reliability for the power-train condition, and the correcting portion corrects the brake feedback torque outputted from the brake feedback control portion in such a manner that a corrected brake feedback torque becomes larger as the degree of reliability for the power-train condition becomes lower.

7. The acceleration control apparatus according to the claim 2, wherein the input torque is an estimated power-train torque, which is estimated for an actually generated power-train torque, the feedback control portion is a brake feedback control portion for outputting a brake feedback torque, the feed-forward control portion calculates a brake feed-forward torque based on a demand axle torque, which is demanded for carrying out an acceleration control of the vehicle in the vehicle traveling direction, and based on the estimated power-train torque, the calculating portion calculates the degree of reliability for a power-train condition, and the correcting portion corrects the brake feedback torque in such a way that the gain for the brake feedback control portion is increased in accordance with the decrease of the degree of reliability for the power-train condition.

8. The acceleration control apparatus according to the claim 7, wherein the calculating portion includes a selecting portion for selecting the degree of reliability corresponding to the power-train condition, and calculates a correction coefficient for a brake feedback control based on the selected degree of reliability for the power-train condition, and the correcting portion corrects the brake feedback torque outputted from the brake feedback control portion in such a manner that a corrected brake feedback torque becomes larger as the degree of reliability for the power-train condition becomes lower.

9. The acceleration control apparatus according to the claim 1, wherein the input torque is an estimated power-train torque, which is estimated for an actually generated power-train torque, the feedback control portion is a brake feedback control portion for outputting a brake feedback torque, the feed-forward control portion calculates a brake feed-forward torque based on a demand axle torque, which is demanded for carrying out an acceleration control of the vehicle in the vehicle traveling direction, and based on the estimated power-train torque, the calculating portion calculates the degree of reliability for a power-train condition, and the correcting portion corrects the brake feedback torque in such a way that the gain for the brake feedback control portion is increased in accordance with the decrease of the degree of reliability for the power-train condition.

10. The acceleration control apparatus according to the claim 9, wherein the calculating portion includes a selecting portion for selecting the degree of reliability corresponding to the power-train condition, and calculates a correction coefficient for a brake feedback control based on the selected degree of reliability for the power-train condition, and the correcting portion corrects the brake feedback torque outputted from the brake feedback control portion in such a manner that a corrected brake feedback torque becomes larger as the degree of reliability for the power-train condition becomes lower.

11. The acceleration control apparatus according to the claim 10, wherein the calculating portion has a map or a function expression for indicating a relationship between the degree of reliability for the power-train condition and the correction coefficient for the brake feedback control, so that the calculating portion obtains the correction coefficient for the brake feedback control corresponding to the degree of reliability for the power-train condition based on the map or the function expression, and the correcting portion corrects the brake feedback torque based on the correction coefficient for the brake feedback control.

12. The acceleration control apparatus according to the claim 1, wherein the plurality of disturbance factors include an accuracy of estimating a braking torque and an accuracy of estimating a power-train torque.

* * * * *